United States Patent [19]
Miller

[11] Patent Number: 5,633,097
[45] Date of Patent: May 27, 1997

[54] ELECTROCHEMICAL CELLS

[76] Inventor: William B. Miller, Whiteleys, Alloway, Ayr., United Kingdom, KA7 4EG

[21] Appl. No.: 532,689

[22] PCT Filed: Apr. 6, 1994

[86] PCT No.: PCT/GB94/00735

§ 371 Date: Oct. 6, 1995

§ 102(e) Date: Oct. 6, 1995

[87] PCT Pub. No.: WO94/23465

PCT Pub. Date: Oct. 13, 1994

[30] Foreign Application Priority Data

Apr. 7, 1993 [GB] United Kingdom ............... 9307298
Jul. 16, 1993 [GB] United Kingdom ............... 9314760

[51] Int. Cl.$^6$ .................. H01M 6/10; H01M 6/46
[52] U.S. Cl. .................. 429/94; 29/623.3; 429/127; 429/162
[58] Field of Search ............... 429/127, 94, 162, 429/124; 29/623.3

[56] References Cited

U.S. PATENT DOCUMENTS 3,006,980 10/1961 Story.
3,230,115 1/1966 Tamminen.
3,313,657 4/1967 Wood.

FOREIGN PATENT DOCUMENTS 0533576 3/1993 European Pat. Off..
0602976 6/1994 European Pat. Off..
2122954 11/1972 Germany.
1078135 8/1967 United Kingdom.

*Primary Examiner*—John S. Maples
*Attorney, Agent, or Firm*—Ratner & Prestia

[57] ABSTRACT

A method of forming arrays of electrochemical cells, and improved arrays of cells formed thereby, in which layers of electrically conductive material (16), layers of cathode material (12) and layers of anode material (10) are applied to first and second flexible, electrically insulating surfaces (18) in respective predetermined patterns such that the areas of applied anode and cathode material corresponding to anodes and cathodes of individual cells on each of said surfaces are formed in electrical connection with or isolation from one another by said pattern of conductive material as required in the finished battery; and said surfaces are assembled together such that respective areas of anode and cathode material on said first surface are aligned with corresponding areas of cathode and anode material of said second surface, electrolyte material being disposed between said first and second surfaces such that a plurality of electrically interconnected cells are formed thereby. The first and second surfaces to which the materials are applied may be provided by separate substrates, or may be side by side or on opposite sides of the same substrate.

7 Claims, 4 Drawing Sheets

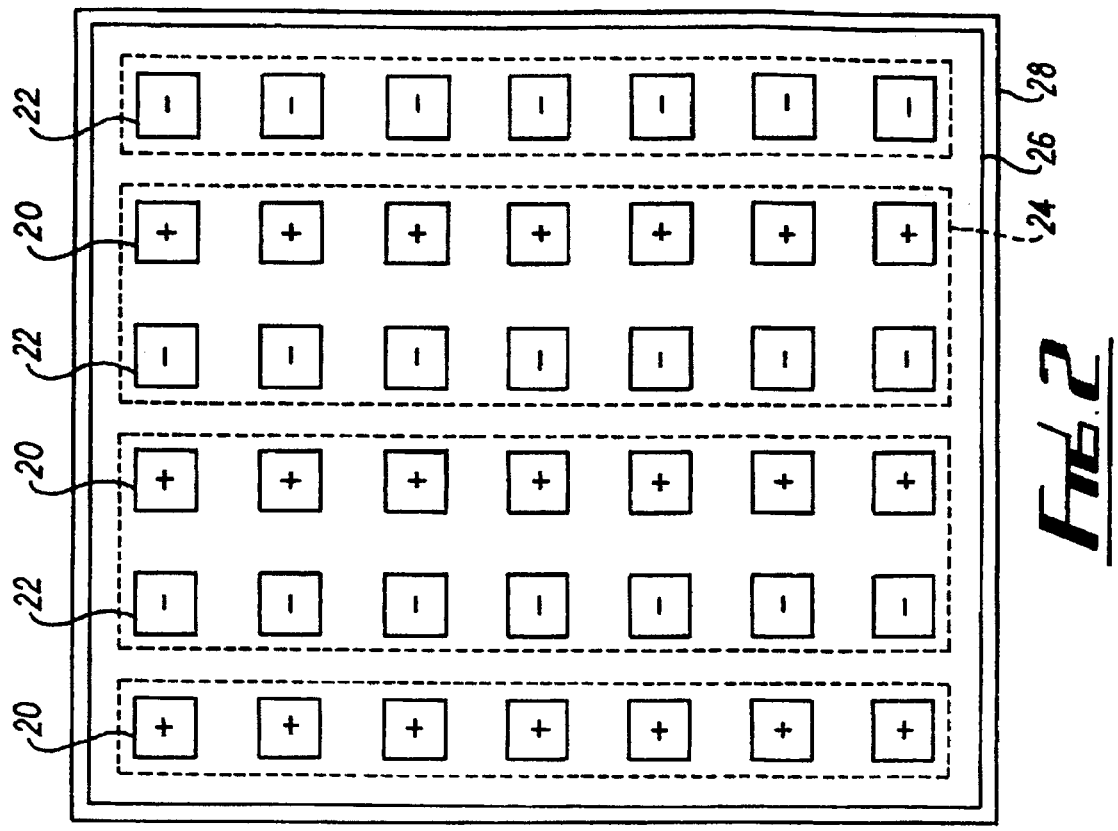
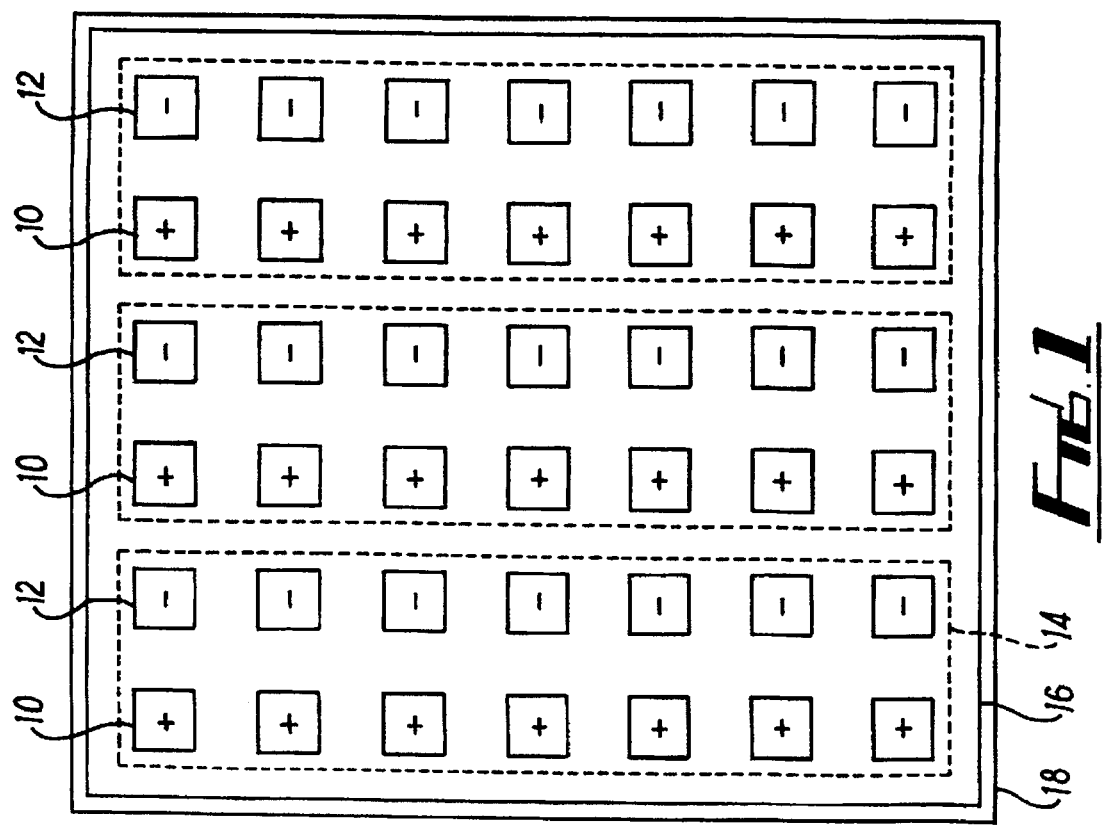

ELECTROCHEMICAL CELLS

The present invention relates to improved methods and materials for the manufacture of electrochemical cells, particularly but not exclusively for dry-cell batteries, and improved electrochemical cells provided thereby.

In the manufacture of conventional dry-cell batteries, the anode and cathode materials are applied to separate webs of insulating material which are then assembled together with electrolyte gel therebetween to form an electrolytic cell. Individual cells are then stacked together to form a battery. The required connections between adjacent anodes and adjacent cathodes (in a parallel-connected battery), or between the anodes and cathodes of successive cells (in a series-connected battery) must then be established by other means. The assembly of the cells and connection of the anodes and cathodes is inconvenient and time-consuming, requiring highly specialised plant if the process is to be automated.

It is an object of the present invention to provide improved methods and materials for the manufacture of electrochemical cells, whereby the manufacturing process is simplified and may be carried out by "standard" automated techniques.

In accordance with a first aspect of the invention there is provided a method of manufacturing electrochemical cells comprising the steps of applying layers of electrically conductive material, layers of cathode material and layers of anode material to first and second flexible, electrically insulating surfaces in respective predetermined patterns such that the areas of applied anode and cathode material corresponding to anodes and cathodes of individual cells on each of said surfaces are formed in electrical connection with or isolation from one another by said pattern of conductive material as required in the finished battery; and assembling said surfaces together such that respective areas of anode and cathode material on said first surface are aligned with corresponding areas of cathode and anode material of said second surface, electrolyte material being disposed between said first and second surfaces such that a plurality of electrically interconnected cells are formed thereby.

Preferably, said conductive material is applied to said surfaces prior to the application of said anode and cathode materials in patterns such that selected anodes and cathodes on each of said surfaces are electrically connected as required in the assembled battery.

Preferably also, a layer of insulating material is applied to at least one of said surfaces in a pattern such that said areas of anode and cathode materials remain exposed.

Preferably also, said layer of insulating material defines a plurality of wells surrounding said areas of anode and cathode material, said electrolyte material being applied to said surface so as to fill said wells prior to the assembly of the first and second surfaces.

Preferably also, said patterns of materials define at least one row of series connected cells extending in a first direction across said surfaces.

Preferably also, said patterns of materials define a plurality of rows of series connected cells extending in said first direction, and a plurality of columns of parallel connected cells extending in a second direction across said surfaces.

In one embodiment of the invention, said first and second surfaces are provided by first and second substrates. In this case, the assembled substrates are preferably folded at least once prior to final packaging to form a finished battery.

In a second embodiment of the invention, the respective surfaces to which the respective patterns of materials are applied are opposite surfaces of the same substrate, the cells being formed by rolling up the substrate so that areas of anode material on one side are aligned with areas of cathode material on the other side (and vice versa), with electrolyte therebetween.

In a first case, the substrate may be an elongate strip with continuous anodes and cathodes disposed side by side and extending along its length, such that a plurality of cells are formed connected in series across the width of the roll. In a second case, the substrate may again be an elongate strip, with anodes and cathodes extending across the width of the strip, a plurality of cells being connected together in series along the length of the rolled substrate.

In accordance with a second aspect of the invention there is provided an array of electrochemical cells comprising first and second surfaces having respective arrays of anodes and cathodes formed thereon, the anodes and cathodes of each array being electrically connected in a predetermined manner by patterns of electrically conductive material applied to said surfaces, and said surfaces being assembled together with respective anodes and cathodes thereof disposed opposite one another with an electrolyte interposed therebetween.

In one embodiment of the invention, said first and second surfaces are provided by first and second substrates. In this case, the assembled substrates are preferably folded at least once prior to final packaging to form a finished battery.

In a second embodiment of the invention, the respective surfaces to which the respective patterns of materials are applied are opposite surfaces of the same substrate, the cells being formed by rolling up the substrate so that areas of anode material on one side are aligned with areas of cathode material on the other side (and vice versa), with electrolyte therebetween.

In a first case, the substrate may be an elongate strip with continuous anodes and cathodes disposed side by side and extending along its length, such that a plurality of cells are formed connected in series across the width of the roll. In a second case, the substrate may again be an elongate strip, with anodes and cathodes extending across the width of the strip, a plurality of cells being connected together in series along the length of the rolled substrate.

Further preferred constructional details of such an array are as defined above in relation to the method of production and as described hereinafter.

Embodiments of the invention will now be described, by way of example only, with reference to the accompanying drawings in which:

FIG. 1 is a schematic plan view illustrating the manner in which anode, cathode and electrically conductive materials are applied to a first substrate surface in accordance with a first embodiment of the invention;

FIG. 2 is a schematic plan view illustrating the manner in which anode, cathode and electrically conductive materials are applied to a second substrate surface in accordance with a first embodiment of the invention;

Figure 3:
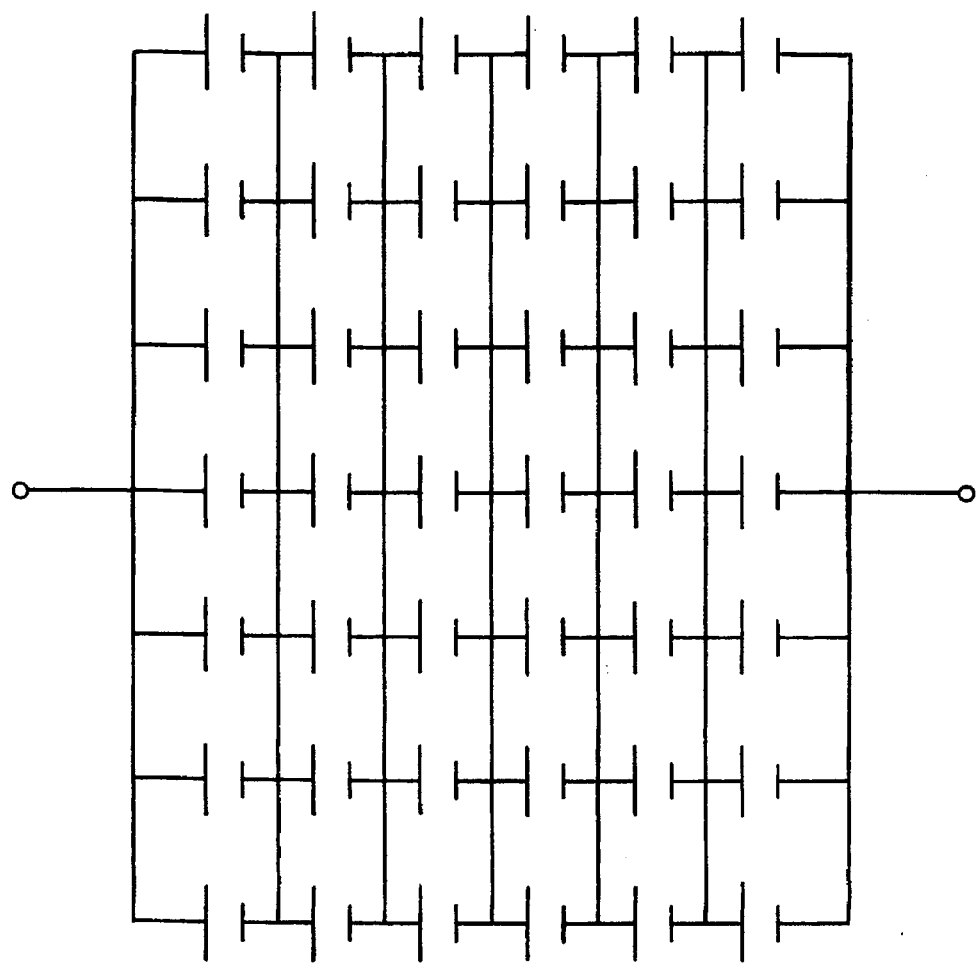
FIG. 3 is an equivalent circuit diagram of a battery of parallel and series connected cells formed by assembling together the substrates of FIGS. 1 and 2 with electrolyte material disposed therebetween.

Referring now to the drawings, FIG. 1 shows a pattern of anode material 10, cathode material 12, electrically conductive material 14, and electrically insulating material 16 applied to a first substrate 18 of thin, flexible, electrically insulating material (suitably polyamide or polyester) for use in forming a battery of electrochemical cells in accordance with the invention.

FIG. 2 shows a second pattern of anode material 20, cathode material 22, electrically conductive material 24, and electrically insulating material 26 applied to a second substrate 28 of thin, flexible, electrically insulating material (suitably polyamide or polyester) for use in forming a battery of electrochemical cells in accordance with the invention when assembled together with the first substrate 18.

In this example, the anode and cathode materials 10 and 12 are applied in alternating vertical columns each comprising a plurality of rectangles of the respective materials. An array of electrodes is thus formed with like electrodes in vertical columns and alternating electrodes of opposite polarity in horizontal rows.

From left to right, as seen in the drawing, the first and second columns, one of anode material 10 and one of cathode material 12, are applied on top of a first, larger rectangle of electrically conductive material 14 applied to the substrate 18. All of the anodes and cathodes provided by the first two columns are thus electrically connected to one another. Successive pairs of columns are similarly connected by means of similar rectangles of conductive material 14.

The insulating material 16 substantially covers the area of the substrate except for the rectangles of anode and cathode material 10, 12, which are left exposed. The insulating material 16 is of sufficient thickness to define shallow wells surrounding each of the anodes and cathodes.

The patterns in which the various materials are applied to the second substrate 28 are similar to those of the first substrate 18. In particular, the anode and cathode materials 20, 22 are applied in alternating columns of like material as in FIG. 1. However, the conductive material 24 is applied such that the pairs of electrically connected columns on the second substrate 28 are displaced horizontally by one column with respect to those of the first substrate 18. In this example, the left and right hand columns of the second substrate 28 are each connected but are isolated from the remaining columns.

The insulating material 26 may be omitted from the second substrate 28, but if included would be generally flush with the top surfaces of the areas of anode and cathode material 20, 22.

The substrates 18 and 28 are assembled together by laying one on top of the other such that the cathodes of the right hand column of the first substrate 18 are aligned with the anodes of the left hand column of the second substrate 28, and the remaining columns are similarly aligned (i.e. the first substrate 18 is laid face down on top of the second substrate 28). The anodes and cathodes of the first substrate 18 are thus aligned with respective cathodes and anodes of the second substrate 28 with electrolyte material sandwiched therebetween, defining an array of electrochemical cells electrically connected in a manner defined by the patterns of conductive material 14, 24 on the respective substrates 18, 28.

In this example, the columns of cells so formed are connected together in parallel with all of the anodes and all of the cathodes in each cell of each row being connected together, whilst the rows of cells are connected together in series with the cathode of each cell being connected to the anode of the following cell in each row. The series connection of the rows of cells is achieved by the relative displacement of the pairs of connected columns on the two substrates 18, 28.

An equivalent circuit of the array of cells is shown in FIG. 3. In this example, the anodes of the left hand column of cells are provided by the isolated left hand column of anodes of the second substrate 28, and the cathodes of the right hand column of cells are provided by the isolated right hand column of the second substrate 28. The isolated left and right hand columns thus provide terminals for the battery, and the corresponding areas of conductive material 24 may be extended to the periphery of the substrate for connection to external terminals in a finished battery.

Figure 4:
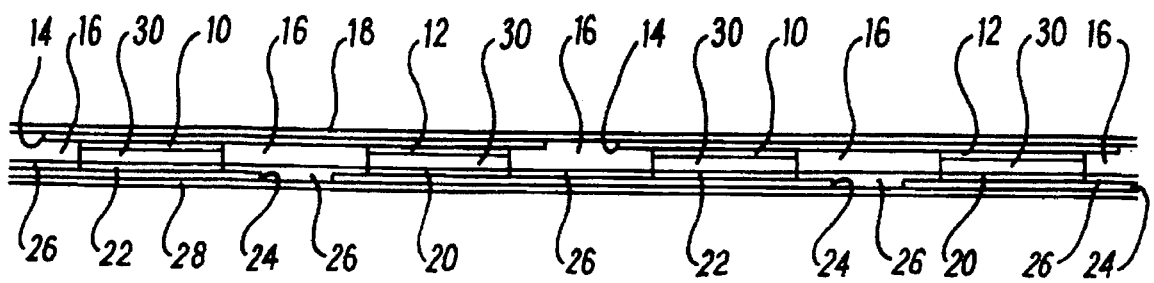
FIG. 4 is a schematic sectional view of a portion of the first and second substrates assembled together.

FIG. 4 is a schematic section through a portion of one row of cells of the assembled substrates, showing the alignment and electrical connection of the respective anodes and cathodes to form series connected cells. The electrolyte material sandwiched between the respective anodes 10, 20 and cathodes 12, 22 is designated by reference numeral 30.

The assembled substrates may be folded one or more times to create a package of cells of a required configuration and volume. It is particularly envisaged that the substrate be folded concertina-fashion along fold axes extending between columns and/or rows of cells. Depending upon the manner of folding, it may be necessary for the relative locations of the anodes and cathodes on the respective substrates to be offset slightly so that they are in proper alignment after folding. The folded substrates may be bonded together or encapsulated in any suitable manner, prior to final packaging.

It will be appreciated that the layout of the materials shown in the drawings is somewhat schematic and is primarily for illustrative purposes. It is noted particularly that the columns of discrete areas of like anode and cathode materials could be formed as continuous strips, such that the columns of discrete parallel connected cells may comprise single, elongate cells. The division of the columns into discrete units may however be desirable for the purposes of folding the substrates. Also, scrap areas between cells might be punched out of the substrates along fold axes to facilitate folding.

The example shows an array of parallel and series connected cells. The size of the array may be varied in the vertical direction (as seen in FIGS. 1 and 2) so as to vary the number and/or surface area of the vertically extending cells and so vary the current output from the battery, and in the horizontal direction so as to vary the number of series connected cells and hence the output voltage of the battery. The dimensions of the array can be varied arbitrarily according to requirements.

The various materials can be applied to the substrates by any suitable techniques as are well known in, for example, the production of printed circuit boards, and the substrates can be folded as required using techniques already existing in numerous fields where sheet materials are required to be folded. It is particularly envisaged that the materials be applied to continuous lengths of substrate material in a roll-to-roll type process, the lengths subsequently being cut as required. The columns of the array may extend either across the width or along the length of such continuous lengths.

The patterns in which the various materials are applied may be varied widely in order to produce similar or different arrangements of cells. The invention is particularly intended for use in the production of dry-cell cell batteries, but is also applicable to producing arrays of electrochemical cells for use in other types of battery.

The invention thus provides a new approach to the manufacture of electrochemical cells which simplifies the manufacturing process and which makes use of standard automated technologies. The required materials may be applied to the substrate in indefinite continuous lengths, and plural sets of cells could be formed across the width of a relatively wide substrate. The first and second substrates might also be formed alongside one another on a unitary substrate which could be folded over to assemble the substrates together.

In accordance with a second embodiment of the invention, the first and second arrays of electrodes which are assembled together to form the electrochemical cells may be formed on opposite sides of the same substrate, rather than being formed on separate substrates or side by side on the same surface of the same substrate as described in relation to the first embodiment. In this case the electrodes of the respective arrays are aligned by rolling the substrate so that electrodes on one side are aligned as required with electrodes on the opposite side.

Figure 5:
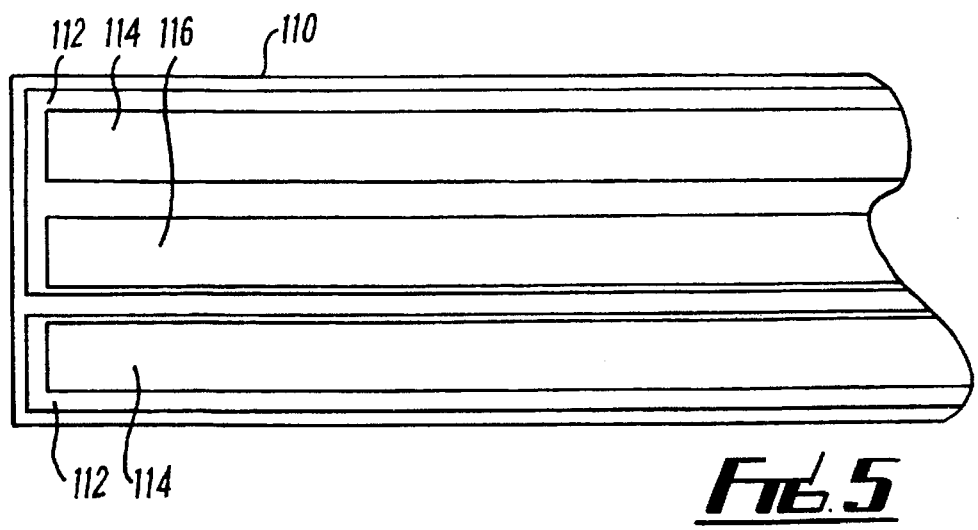
FIG. 5 is a schematic plan view of a strip of laminated material in accordance with a second embodiment the invention which may be rolled about a transverse axis in order to form a battery with three serially connected cells across its width.
Figure 6:
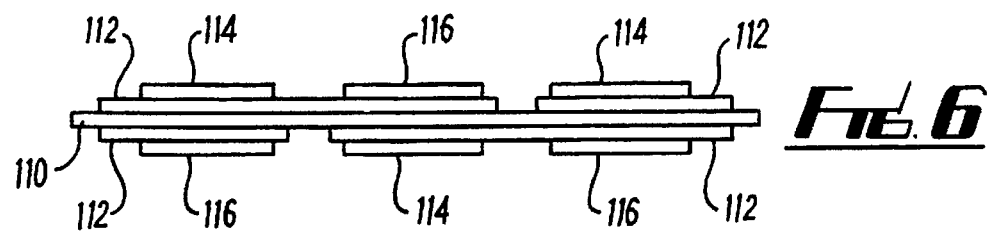
FIG. 6 is a schematic end view of the strip of FIG. 5.

Referring now to FIGS. 5 to 9 of the drawings, FIGS. 5 and 6 show a laminated strip of material which may be rolled along its length about a transverse axis in order to form a battery.

In this example, the strip provides three continuous cells extending along the length of the strip and electrically connected in series across its width. Each cell has a characteristic voltage, so that batteries of differing voltage may be produced by varying the number of cells across the width of the strip. The current produced by the battery varies with the cell area, so that the current may be adjusted by varying the width and/or length of the strip.

The strip comprises a substrate 110 having complementary stripes of conductive material 112, anode material 114 and cathode material 116 applied to its upper and lower surfaces. On the upper surface, seen in FIG. 5, a first stripe of anode material 114 and a stripe of cathode material 116 are applied on top of a common first stripe of conductive material 112, and a second stripe of anode material 114 is applied on top of a separate second stripe of conductive material 112.

The accompanying drawings are primarily for illustrative purposes. In particular, the thicknesses of the substrate and various layers have been greatly exaggerated for the sake of clarity.

On the lower surface, as may be seen in FIG. 5, first and second stripes of cathode material 116 are disposed opposite the anodes of the upper surface and a stripe of anode material 114 is disposed opposite the cathode of the top surface. The first lower cathode is applied on top of a separate first strip of conductive material 112, whilst the lower anode and second cathode are applied on top of a common second stripe of conductive material 112.

Accordingly, when the strip is rolled up so that the upper and lower surfaces are sandwiched together, with electrolyte material 120 therebetween (see FIG. 7), three electrochemical cells are formed side by side along the length of the rolled strip, electrically connected in series across the width of the strip.

Figure 7:
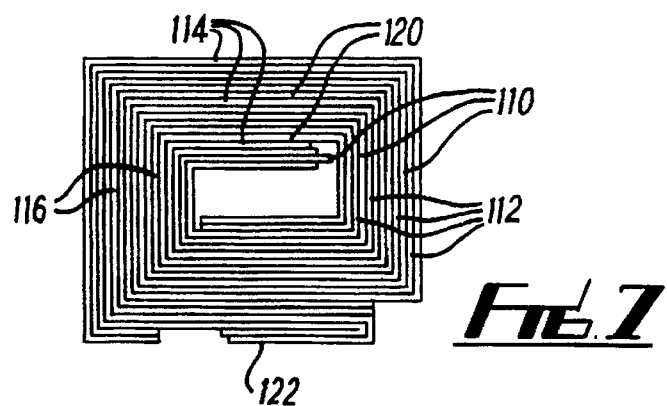
FIG. 7 is a schematic side view of a length of the strip of FIG. 5 rolled to form a battery.
Figure 8:
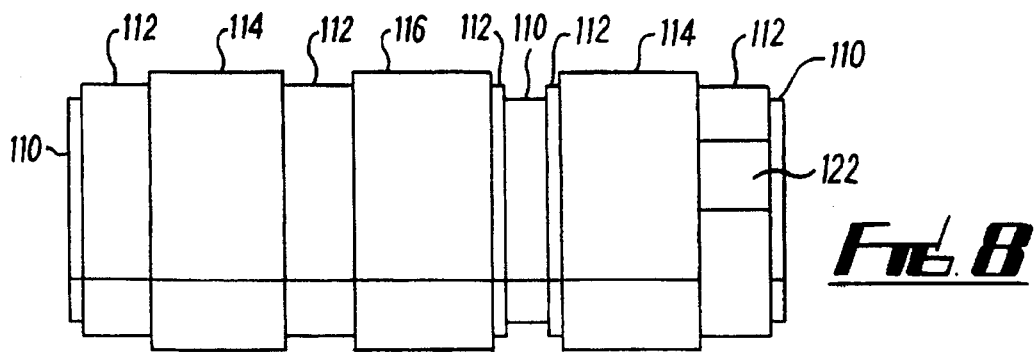
FIG. 8 is a schematic plan view of the strip of FIG. 7.
Figure 9:
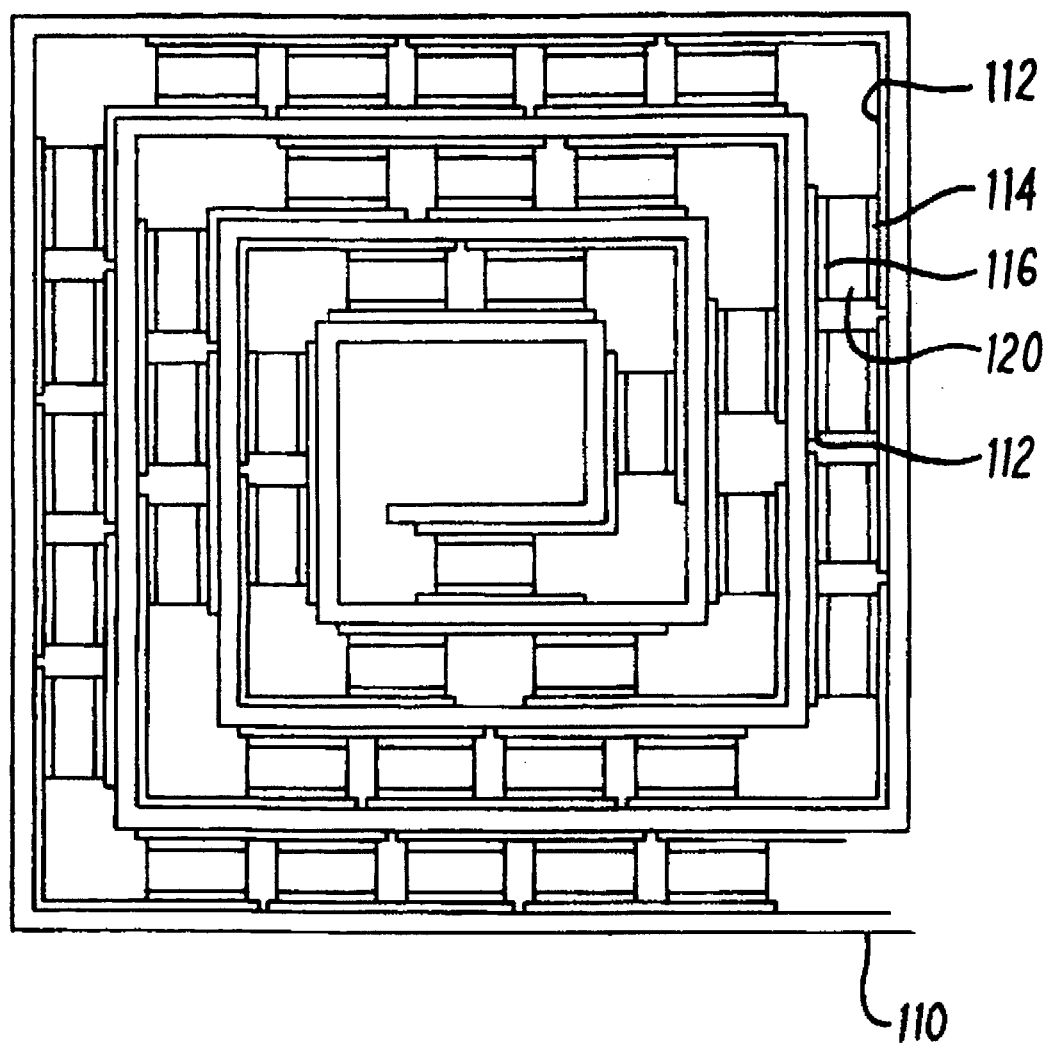
FIG. 9 is a schematic side view of a second type of rolled strip forming a battery in accordance with a variation of the second embodiment of the invention, in which a plurality of cells are serially connected along the length of the strip.

FIG. 7 shows an end view of a rolled strip. Only two and a half turns are shown to illustrate the rolling of the strip, and a square roll is shown for clarity. The roll might be cylindrical or generally flat. The substrate 110 is shown in bold lines. Between each two layers of substrate 110 in the roll, there is a first conductive layer 112 and a first anode 114 or cathode 116 layer attached to the outer surface of the inner layer; a layer of electrolyte material 120; and a second cathode 116 or anode 114 layer and a second conductive layer 112 attached to the inner surface of the outer layer.

Connection terminals for the completed battery can be provided in a various ways. The materials can be applied such that connections can be made to the conductive material 112 either at the side edges of the rolled strip or on the outer surface of the roll. Where there is an even number of cells across the strip, then the conductive layer beneath the end electrodes at either side of the strip will be exposed on the outer surface of the roll, so that there is no difficulty with access for establishing connections. With a single or other odd number of cells, the conductive layer 122 of one of the end electrodes will be on the inner surface of the substrate. This conductive layer can be exposed for connection by cutting the end of the strip and folding back the substrate as is shown schematically in FIGS. 7 and 8. Alternatively, a connection could also be made to the inner conductive layer through the centre of the roll to an exposed portion 124 of conductive material at the innermost end of the strip. A suitable connector could be incorporated into a former (not shown) for the rolled strip.

The laminated material and rolled strip would also incorporate insulating materials and the like to isolate parts of the assembly from one another as required, as discussed in relation to the first embodiment above.

FIG. 5 illustrates the structure of a rolled strip in which a number of discrete cells are connected in series along the length of the strip. The substrate and various layers are numbered as in FIGS. 1 to 4.

Modifications and improvements may be made without departing from the scope of the invention.

I claim:

1. An array of electrochemical cells comprising first and second surfaces having respective arrays of anodes and cathodes formed thereon, the anodes and cathodes of each array being electrically connected by patterns of electrically conductive material applied to said surfaces, and said surfaces being assembled together with respective anodes and cathodes thereof disposed opposite one another with an electrolyte interposed therebetween; wherein the respective surfaces to which the respective patterns of materials are applied are opposite surfaces of a common substrate, the cells being formed by rolling up the substrate so that areas of anode material on one side are aligned with areas of cathode material on the other side, with electrolyte therebetween; and wherein the substrate is an elongate strip with continuous anodes and cathodes disposed side by side and extending along its length, such that a plurality of cells are formed connected in series across the width of the roll.

2. An array of electrochemical cells comprising first and second surfaces having respective arrays of anodes and cathodes formed thereon, the anodes and cathodes of each array being electrically connected by patterns of electrically conductive material applied to said surfaces, and said surfaces being assembled together with respective anodes and cathodes thereof disposed opposite one another with an electrolyte interposed therebetween; wherein the respective surfaces to which the respective patterns of materials are applied are opposite surfaces of a common substrate, the cells being formed by rolling up the substrate so that areas of anode material on one side are aligned with areas of cathode material on the other side, with electrolyte therebetween; wherein the substrate is an elongate strip with continuous anodes and cathodes disposed side by side and extending along its length, such that a plurality of cells are formed connected in series across the width of the roll; and wherein said electrically conductive material comprises at least a first elongate strip extending along the length of a first surface of said substrate and at least first and second elongate, substantially parallel strips, electrically isolated from one another and extending side by side along the second side of said substrate, said first strip of conductive material on said first surface having first and second elongate, substantially parallel strips of anode and cathode material applied to its surface and extending side by side along the length thereof, one of said strips of conductive material on said second surface having an elongate strip of anode material applied to its surface and extending along the length thereof and the other of said strips of conductive material on said second surface having an elongate strip of cathode material applied to its surface and extending along the length thereof, said strip of anode material on said first surface being aligned with said strip of cathode material on said second surface and said strip of cathode material on said first surface being aligned with said strip of anode material on said second surface.

3. A method of manufacturing electrochemical cells comprising the steps of applying layers of electrically conductive material, layers of cathode material and layers of anode material to first and second flexible, electrically insulating surfaces in respective patterns such that the areas of applied anode and cathode material corresponding to anodes and cathodes of individual cells on each of said surfaces are formed in electrical connection with or isolation from one another by said pattern of conductive material; and assembling said surfaces together such that respective areas of anode and cathode material on said first surface are aligned with corresponding areas of cathode and anode material of said second surface, electrolyte material being disposed between said first and second surfaces such that a plurality of electrically interconnected cells are formed thereby; wherein the respective surfaces to which the respective patterns of materials are applied are opposite surfaces of a common substrate, the cells being formed by rolling up the substrate so that areas of anode material on one side are aligned with areas of cathode material on the other side, with electrolyte therebetween; and wherein the substrate is an elongate strip with continuous anodes and cathodes disposed side by side and extending along its length, such that a plurality of cells are formed connected in series across the width of the roll.

4. The method of claim 3 wherein said conductive material is applied to said surfaces prior to the application of said anode and cathode materials in patterns such that selected anodes and cathodes on each of said surfaces are electrically connected in the assembled battery.

5. The method of claim 3 wherein a layer of insulating material is applied to at least one of said surfaces in a pattern such that said areas of anode and cathode materials remain exposed.

6. The method of claim 5 wherein said layer of insulating material defines a plurality of wells surrounding said areas of anode and cathode material, said electrolyte material being applied to said surface so as to fill said wells prior to the assembly of the first and second surfaces.

7. A method of manufacturing electrochemical cells comprising the steps of applying layers of electrically conductive material, layers of cathode material and layers of anode material to first and second flexible, electrically insulating surfaces in respective patterns such that the areas of applied anode and cathode material corresponding to anodes and cathodes of individual cells on each of said surfaces are formed in electrical connection with or isolation from one another by said pattern of conductive material; and assembling said surfaces together such that respective areas of anode and cathode material on said first surface are aligned with corresponding areas of cathode and anode material of said second surface, electrolyte material being disposed between said first and second surfaces such that a plurality of electrically interconnected cells are formed thereby; wherein the respective surfaces to which the respective patterns of materials are applied are opposite surfaces of a common substrate, the cells being formed by rolling up the substrate so that areas of anode material on one side are aligned with areas of cathode material on the other side, with electrolyte therebetween; wherein the substrate is an elongate strip with continuous anodes and cathodes disposed side by side and extending along its length, such that a plurality of cells are formed connected in series across the width of the roll; and wherein said electrically conductive material comprises at least a first elongate strip extending along the length of a first surface of said substrate and at least first and second elongate, substantially parallel strips, electrically isolated from one another and extending side by side along the second side of said substrate, said first strip of conductive material on said first surface having first and second elongate, substantially parallel strips of anode and cathode material applied to its surface and extending side by side along the length thereof, one of said strips of conductive material on said second surface having an elongate strip of anode material applied to its surface and extending along the length thereof and the other of said strips of conductive material on said second surface having an elongate strip of cathode material applied to its surface and extending along the length thereof, said strip of anode material on said first surface being aligned with said strip of cathode material on said second surface and said strip of cathode material on said first surface being aligned with said strip of anode material on said second surface.

* * * * *